(No Model.)
A. G. LAWRENCE.
PULLEY SUPPORT.
No. 402,251. Patented Apr. 30, 1889.
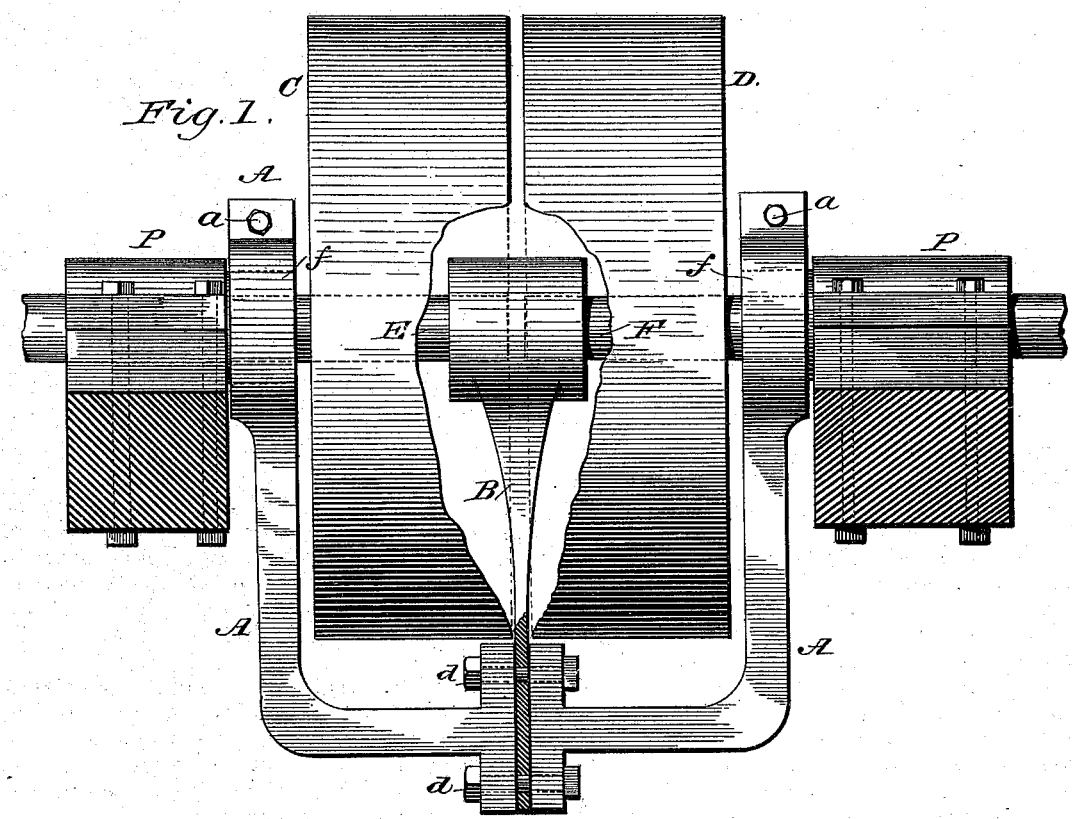
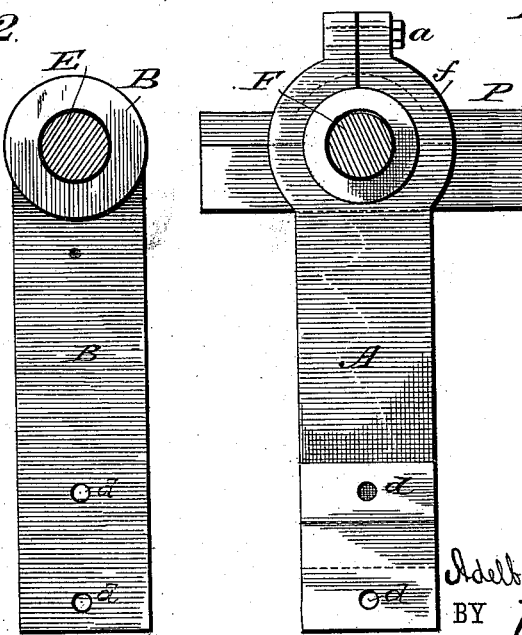
WITNESSES:
Fred G. Dieterich
Jolon C. Kenon
INVENTOR:
Adelbert G. Lawrence
BY
ATTORNEYS.
N. PETERS, Photo-Lithographer, Washington, D. C.

UNITED STATES PATENT OFFICE.

ADELBERT G. LAWRENCE, OF MOTLEY, MINNESOTA.

PULLEY-SUPPORT.

SPECIFICATION forming part of Letters Patent No. 402,251, dated April 30, 1889.

Application filed June 21, 1888. Serial No. 277,858. (No model.)

*To all whom it may concern:*

Be it known that I, ADELBERT G. LAWRENCE, residing at Motley, in the county of Morrison and State of Minnesota, have invented certain new and useful Improvements in Pulley-Supports, of which the following is a specification.

This invention relates to pulleys for shifting belts; and it consists, essentially, of a yoke turned to fit on the ends of the boxes and capable of being adjusted to any angle, supporting at its center an arm, wide and thin where it passes between the rims of the pulleys and terminating in a box between said pulleys, which supports the ends of the shafts, on which are journaled the working and idle pulleys respectively.

It further consists in the peculiar combination and novel construction of parts, as will be hereinafter fully described, and pointed out in the claims, reference being had to the accompanying drawings, in which—

Figure 1 is a front elevation of my improvement with a portion of the pulleys broken away to more clearly show the arm terminating in a box which supports the ends of the two shafts. Fig. 2 is a detail view of the arm; and Fig. 3 is a view of one-half of the yoke, showing the mode of clamping on the boxes.

In the drawings, C D indicate the working and idle pulleys respectively, and E F their respective shafts, their ends terminating in and supported by the box end of the arm B, arranged between the pulleys, as shown.

P P are two boxes turned up at $ff$ to receive the yoke A A. The arm B and the yoke A A, which is made in two parts, are rigidly fastened together by means of the bolts $d\ d$. (See Fig. 1.) The shafts E F being hung in perfect alignment, the yoke A A, with its arm B, will be free to move around them and can be clamped in any position by means of the bolts $a\ a$.

By this construction it will be seen that this allows the idle-pulley and its shaft to remain stationary while the other is in motion, thereby doing away with the continual wear and jumping of the idle-pulley in machinery run at a high rate of speed.

Having thus described my invention, what I claim, and desire to secure by Letters Patent, is—

1. In combination with the pulleys C D, the shafts E F, yoke A A, arm B, and the boxes P P, reduced at $ff$, substantially as set forth.

2. In combination with the fast and loose pulleys and the shafts, the yoke A A, and an arm passing between the pulleys and provided with a box at one end for inclosing the meeting ends of the shafts, substantially as set forth.

ADELBERT G. LAWRENCE.

Witnesses:
GEORGE WILLETT,
WM. WILLETT.